United States Patent [19]

Olney

[11] 4,221,507

[45] Sep. 9, 1980

[54] MICROBUBBLE FEEDING APPARATUS AND METHOD

[75] Inventor: Robert S. Olney, Bethlehem, Pa.

[73] Assignee: Atlas Powder Company, Tamaqua, Pa.

[21] Appl. No.: 848,660

[22] Filed: Nov. 4, 1977

[51] Int. Cl.² ............................................ B65G 53/66
[52] U.S. Cl. ..................................... 406/33; 198/505; 222/55
[58] Field of Search ................... 302/3, 11, 12, 21, 62; 198/505, 544, 548, 625; 222/55, 56, 63, 77, 413; 406/10, 28, 32, 33

[56] References Cited

U.S. PATENT DOCUMENTS

| | | | |
|---|---|---|---|
| 2,658,604 | 11/1953 | Erdmenger et al. | 198/548 |
| 2,966,253 | 12/1960 | Gerrans | 198/572 |
| 3,139,217 | 6/1964 | Mell | 198/505 |
| 3,186,602 | 6/1965 | Ricciardi | 222/161 |
| 3,252,618 | 5/1966 | Anderson et al. | 222/56 |
| 3,430,751 | 3/1969 | Bateson | 198/505 |
| 3,494,507 | 2/1970 | Ricciardi | 222/56 |
| 3,953,077 | 4/1976 | Kulyabko et al. | 222/56 |

*Primary Examiner*—Jeffrey V. Nase
*Attorney, Agent, or Firm*—Richards, Harris & Medlock

[57] ABSTRACT

A method and apparatus are provided for the metered delivery of microbubbles, used for example, in the production of explosive compositions. Disclosed is a holding vessel with sufficient residence time to deaerate the microbubbbles with a level indicating device for sensing the quantity of microbubbles deposited therein, the outlet of the holding vessel communicating with a dual screw feed apparatus for delivering a constant volumetric flow of deaerated microbubbles from the holding vessel and a weigh-belt, upon which the microbubbles ae deposited as they exit the screw feeder, for providing a constant flow of microbubbles by weight for delivery to processing apparatus.

10 Claims, 1 Drawing Figure

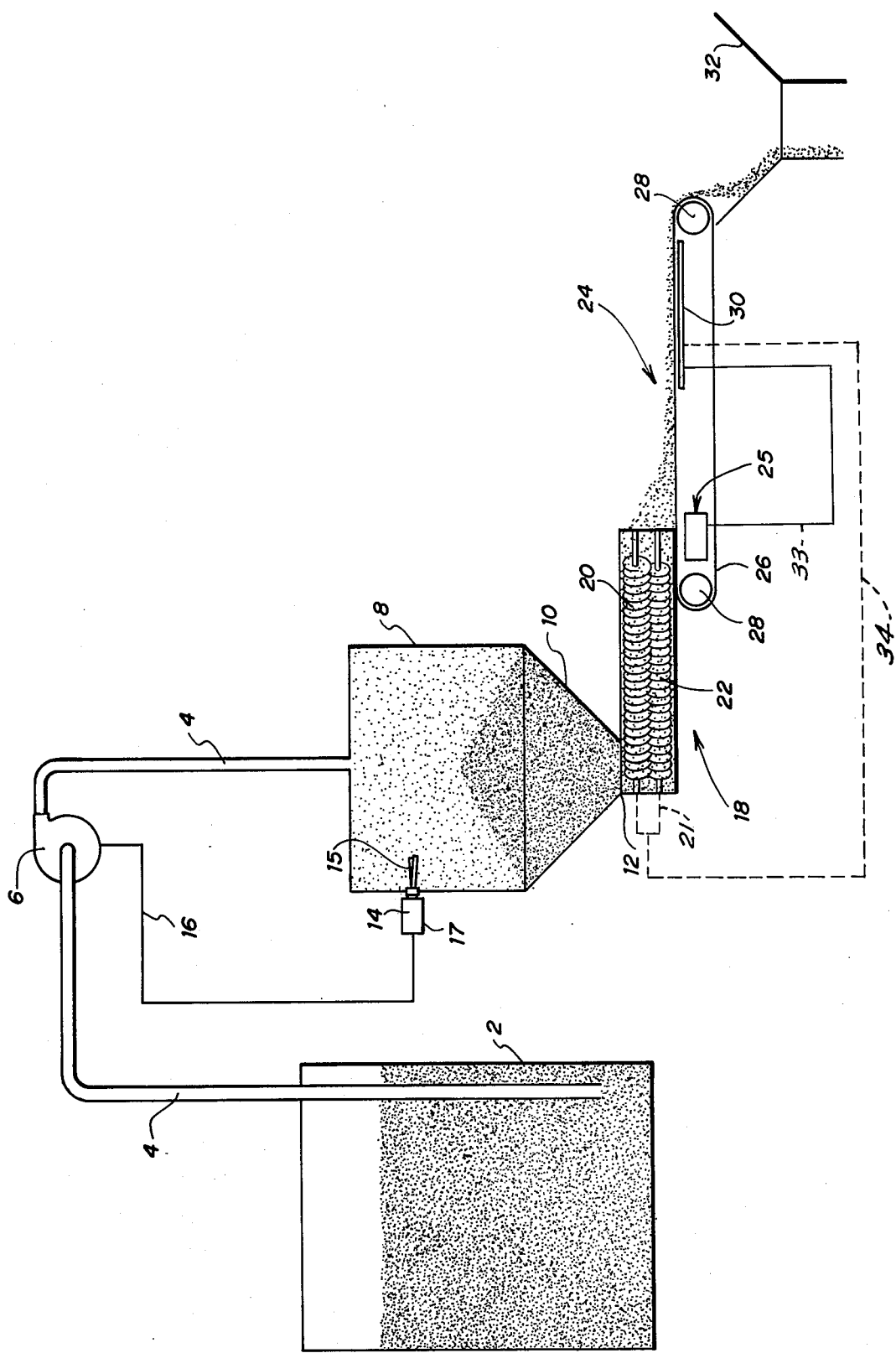

MICROBUBBLE FEEDING APPARATUS AND METHOD

BACKGROUND OF THE INVENTION

In one aspect the present invention relates to a method for the metered delivery of microbubbles for admixture with other components in the production of explosive compositions. In another aspect, the present invention relates to apparatus for handling and feeding microbubbles on a continuous basis which is highly accurate and can be employed to deliver microbubbles either on the basis of weight or on the basis of volume. In a further aspect the present invention relates to a control system for insuring that a deaerating holding vessel for microbubbles contains a constant volume thereof by providing for automatic delivery and shut off of microbubbles from a storage source thereof.

In the manufacture of explosive compositions which are based upon water in the form of oxidizing salt solutions, for example, it is well known in the art that the density of a composition plays a major role in the ultimate sensitivity of the explosive. Thus, in the past, occluded air has been employed in gel type explosives in order to attain the desired density. Recently however the use of glass or resin microbubbles to obtain desired densities of explosive compositions has gained wide acceptance in the explosives art. For example, it has recently been discovered that microbubbles, or other void containing materials, can be employed with a fuel component, an emulsifier and an oxidizing salt solution to form cap sensitive explosive emulsion products. Commercial manufacture of explosives employing closed cell void materials in the form of microbubbles entail the metered introduction of such materials for admixture with the other components of the explosive composition and because of the very low density of the microbubbles themselves the amounts which are added to known quantities of explosive compositions must be carefully controlled if the desired density of the final composition is to be achieved.

The microbubbles employed in explosive compositions can be produced from a variety of materials but they all are generally of a bubble or spherical shape and are hollow and either contain a gas such as air, or can be evacuated, or partially evacuated. In the preparation of cap sensitive explosive emulsion compositions the preferred types of microbubbles are discrete glass spheres having a particle size within the range of from about 10 to about 175 microns. In general, the bulk density of such particles can be in the range of about 0.10 to about 0.40 g/cc. Some preferred glass microbubbles which can be utilized in the preparation of cap sensitive explosive emulsions are the microbubbles sold by 3M Company and which have a particle size distribution in the range of from about 10 to about 160 microns, and a nominal size in the range of from about 60 to 70 microns, and densities in the range of from about 0.10 to about 0.4 g/cc. Other types of glass microbubbles are sold under the trade designation of Eccospheres by Emerson & Cumming, Inc., and generally have a particle size range from about 44 to about 175 microns and a density of about 0.15 to about 4.0 g/cc. Still other suitable microbubbles for use in cap sensitive explosive emulsions include the inorganic microspheres sold under the trade designation of Q-CEL by Philadelphia Quartz Company.

In addition to glass microbubbles, phenoformaldehyde microbubbles are available and can be utilized in the production of cap sensitive emulsion explosives. Further, microbubbles are available which are manufactured from saran. These saran microbubbles have a diameter of about 30 microns and a density of about 0.032 g/cc.

All of the above types of microbubbles are similar in that they have very small diameters and low bulk densities. The result is that the handling and accurate metering of such materials presents problems on a commercial scale. The physical characteristics of the microbubbles are such that an aerated quantity thereof has flow characteristics similar to Newtonian liquids, for example, water (under standard conditions). However, the handling characteristics of the microbubbles change drastically once they have become settled and deaerated so that handling them as liquids by the use of pumps or the like is not feasible. Furthermore, because of the low bulk density of the microbubbles, and their peculiar physical characteristics, precise measurement of a quantity thereof is difficult. For example, because of the highly particulate nature and low density of the microbubbles normal level indicators, such as floats and the like, which could be employed in a holding tank of liquid to determine the volume of liquid contained therein, cannot be successfully employed for the same purpose in a holding tank for microbubbles. Further, the very low bulk density of the microbubbles would require very sensitive weighing apparatus in order to determine the volume of microbubbles held in a holding tank by measuring variances in the total weight of the tank and microbubbles.

Because the accurate addition of known quantities of microbubbles to the other chemical constituents of explosive compositions in order to control the sensitivity thereof, as well as in other applications, is desirable, an automatic feeding system for the metered addition of microbubbles, having the difficult handling characteristics described above, would be advantageous. Further, a method for determining accurately the amount of microbubbles held in a holding tank thereof, for example, the hopper connected with a feeding apparatus, would also be highly advantageous.

SUMMARY OF THE INVENTION

In accordance with the present invention I have discovered that the peculiar handling characteristics of microbubbles which have caused problems in the accurate metering of these materials in the production of emulsion explosive compositions, for example, can be overcome by allowing the microbubbles to deaerate so as to change their flow characteristics from those similar to a Newtonian fluid to those of particulate matter, such as sand, for example. The term "aerated" as used herein refers to microbubbles which because of transportation, or other agitation, have become admixed with air and behave much like a Newtonian liquid under standard conditions. Thus, an aerated quantity of microbubbles will tend to flow like water through the outlets of containers and behave generally like a liquid. The bulk density of an aerated quantity of microbubbles will be very low compared to the particle density of the individual microbubbles. The term "deaerated" as used herein refers to a quantity of microbubbles which have settled significantly such that the fluidizing characteristics of admixed air have dissipated and the microbubbles have attained the handling characteristics of a particulate material such as sand, for example. Thus, a deaerated quantity of microbubbles will have an angle of repose during storage whereas an aerated quantity will tend to flow into the shape of the container in a manner analogous to liquids. Generally, it has been discovered that the change in handling characteristics (between aerated and deaerated microbubbles) occurs when the bulk density of a quantity of microbubbles approaches from about 80 to about 95% of the bulk density of an uncompacted deaerated quantity thereof.

Thus, by providing a system which insures that a holding vessel for microbubbles will always have a substantial quantity deposited therein while metered quantities are being withdrawn therefrom, the desirable flow characteristics can be obtained because of the deaeration which occurs during settling.

The apparatus of the present invention basically comprises a microbubble holding vessel to which a quantity of microbubbles can be delivered and allowed to deaerate so as to obtain the desired flow characteristics similar to caked particulate matter. The outlet end of the holding vessel communicates with a dual screw feed mechanism which provides for a constant volumetric output of microbubbles at any given rotational speed employed. The dual screw type feed mechanism, which basically comprises two parallel shafts having screw flights mounted thereon which mesh along a portion thereof is necessary because a single screw feed may allow the particulate microbubbles to flow along the flights of the single screw even when rotation thereof has ceased. At the outlet end of the screw feed mechanism a weigh-belt feed mechanism is provided which delivers a uniform flow rate, based on the weight of microbubbles, to a delivery point such as a blender in an emulsion explosive processing line. Thus, by allowing the weigh-belt apparatus to merely act as a conveyor (that is, deactivating the weight control mechanism) a steady volumetric flow rate of microbubbles can be delivered to a desired processing point by operating the dual screw feed mechanism at a constant rotational speed. On the other hand, if desired, a known flow rate, based on the weight of microbubbles, can be delivered to a processing point by operating the dual screw feeder to deliver a constant volumetric flow rate of microbubbles onto the weigh-belt feeder and allowing the weight sensing mechanism of the weigh-belt feeder to speed or slow the belt as is necessary in order to deliver the constant flow rate, by weight, of microbubbles to the processing point.

In order to facilitate the above process I have discovered an accurate means for determining the level of microbubbles contained in a holding vessel which can be employed as a control signal such that microbubbles can be delivered to the holding tank when the volume therein drops below a predetermined level. The sensing mechanism of the present invention comprises a tuning fork means which is electronically vibrated at a known frequency. Frequency sensing means are functionally connected with the tuning fork such that when the frequency changes an electrical signal is generated. The tuning fork will have a steady frequency while vibrating in air and will have a changed frequency when the particulate microbubbles are present between the prongs of the tuning fork. Thus, this sensing mechanism can be employed by installing the tuning fork at a known level within a vessel of known dimensions and causing the tuning fork to vibrate at a known frequency with microbubbles present between the prongs thereof. When a sufficient quantity of microbubbles have left the holding vessel, via the screw feeder described above, causing the level of microbubbles to drop in the holding vessel and air to replace microbubbles between the prongs of the tuning fork, the change in frequency which occurs will generate an electric signal which can be used to operate a delivery source of microbubbles to the holding vessel to restore the quantity therein to the desired level. In this manner the quantity of microbubbles in a holding tank will always be kept at a level sufficient to allow deaeration of the microbubbles to occur before passing into the screw-type feeder discussed above.

BRIEF DESCRIPTION OF DRAWING

The drawing is a schematic representation of one embodiment of the invention.

DETAILED DESCRIPTION OF THE INVENTION

The apparatus and process of the subject invention will now be described in detail with relation to the drawing which schematically depicts a processing arrangement of apparatus useful in the present invention.

Thus, referring to the drawing a storage container 2 for microbubbles, which can be the drum or box-like containers in which microbubbles are sold on a commercial basis, is depicted with a vacuum delivery conduit 4 inserted therein. Interconnected with vacuum delivery conduit 4 is a vacuum source 6 which creates a vacuum downline thereof to pull microbubbles in container 2 through vacuum delivery conduit 4 and creates an airflow upline thereof to deliver the microbubbles through vacuum delivery conduit 4 to holding vessel 8. Holding vessel 8 can comprise any of a number of known configurations for particulate material such as hoppers, and the like, preferably having conical-shaped surface 10 at the bottom thereof communicating with an outlet 12. Of course any of a number of holding vessels having decreasing cross sections can be employed.

Mounted at a preselected level within holding vessel 8 is a tuning fork level indicator mechanism 14. Basically, the tuning fork level indicating mechanism 14 comprises a vibrating tuning fork 15 having two or more prongs which can be vibrated by piezocrystals, for example, with electronic frequency sensing apparatus contained in the housing 17 from which the tuning fork 15 extends. In operation, if the vibrating tuning fork is free of material, the system begins to vibrate at its resonant frequency and within a predetermined time frame an internal relay is energized. In the system of the present invention, the internal relay is connected with vacuum source 6 (via electrical conduit 16) such that when air is present between the prongs of the tuning fork 15 vacuum source 6 is activated and microbubbles are delivered from storage container 2 to holding vessel 8 via vacuum delivery conduit 4. Once the prongs of the tuning fork 15 become covered with microbubbles, the change in frequency of oscillation causes the internal relay to be deenergized after a predetermined interval of the time. In the present system, deenergizing the relay causes vacuum source 6 to cease delivery of microbubbles to holding vessel 8, the electric signal being communicated to vacuum source 6 along electrical conduit 16. A suitable tuning fork level indicating mechanism is manufactured by Endress & Hauser, Inc., Greenwood, Ind., and is sold under the trade name VIBRATROL. Thus, by employing the above type of level indication system, in combination with a vacuum source (or other delivery systems), the delivery of microbubbles to holding vessel 8 is accomplished in a manner which insures that the level of microbubbles contained therein is kept at a relatively constant level.

The configuration and capacity of holding vessel 8 is constructed such that at the maximum rate of output of microbubbles from outlet 12 thereof the residence time of microbubbles within holding vessel 8 will be sufficient to allow deaeration to occur. For example, on a commercial scale a minimum residence time of about 7 minutes may be employed. The mode of delivery of microbubbles shown in the drawing necessarily causes them to be delivered to holding vessel 8 in a state of aeration in which the flow properties thereof will be similar to a Newtonian fluid such as water. Thus, by providing for a minimum residence time such as that set forth above, the microbubbles delivered to holding vessel 8 are allowed to deaerate and become settled to an extent that the flow characteristics thereof at outlet 12 will more nearly approach that of a caked particulate material. As schematically shown in the drawing, the microbubbles contained in the lower portion of holding vessel 8 will be in a more compacted state than will those which have just entered holding vessel 8 via vacuum delivery conduit 4.

Different microbubbles will have different settling qualities depending upon the material from which they are manufactured, their density, and shape. Furthermore, the residence time required will vary with the configuration of the holding vessel 8 being employed. However, it has been discovered that the flow characteristics of the microbubbles changes from those of a liquid to those similar to more easily handled and metered particulate material when a quantity thereof obtains about 80 to about 95% of the bulk density of a substantially deaerated uncompacted quantity thereof. For example, glass microbubbles sold under the trade designation B-15-250 by 3M Corporation were found to have a bulk density of about 0.084 g/cc in a deaerated state. The initial aerated density of a quantity of these microbubbles (obtained by shaking a graduated cylinder about two-thirds full to thereby entrap air between the microbubbles) is approximately 0.055 g/cc. When allowed to settle (and thereby deaerate) and handling characteristics changed from a fluidized to a non-fluidized state at approximately 0.078 g/cc. Thus, the change in handling characteristics occurred once about 92% of the final deaerated bulk density had been achieved. Similar experiments showed that when using microbubbles sold by 3M Corporation under the trade designations B-38-4000 and B-28-750 the change in handling characteristics occurred at 87% and 92% of bulk density, respectively.

Returning to the drawing the outlet 12 of holding vessel 8 is shown communicating with dual screw feed mechanism 18. Basically, dual screw feed mechanism 18 comprises two auger feed screws 20 and 22, aligned in parallel such that the flights thereof intermesh. Drive means 21 for feed screws 20 and 22 are shown as an alternate embodiment. The parallel auger screw arrangement provides for a controlled volumetric flow through dual screw feed mechanism 18 at any given rotational speed of the screw augers 20 and 22. This is so even though the inlet end of the screw feed mechanism communicates with the outlet 12 of holding vessel 8 since the settled, deaerated microbubbles will not be allowed to free-flow along the flights of the augers because the path of flow will be blocked by the intermeshing flights of the parallel augers. Therefore, upon rotation of the parallel auger screws of screw feed mechanism 18, a controlled volumetric flow rate of microbubbles will be deposited on weigh-belt apparatus 24.

Basically, weigh-belt apparatus 24 comprises an endless conveyor track 26 driven by conventional drive means 25 about suitable roller mechanisms 28. Located under a portion of endless conveyor track 26 on the upper side thereof is weight sensing apparatus 30. This weight sensing apparatus 30 is interconnected by electrical conduit 33 with the drive means 25 of weigh-belt apparatus 24 and is electronically controlled such that, depending upon the weight of the particulate material deposited on conveyor track 26, the drive means 25 operates slower or faster, thus rotating conveyor track 26 at a varying rate in order to deliver a constant weight flow-rate of microbubbles to processing point 32.

The weigh-belt feed mechanism 24 and screw feed apparatus 18 can be used together to deliver flow-rates of microbubbles to a processing point 32 either on the basis of a constant volumetric flow-rate or, in the alternative, on the basis of a constant weight flow-rate. Thus, when it is desired to deliver a constant weight flow-rate of microbubbles to a processing point 32, the microbubble delivery system of the present invention can be operated in the following manner. Screw feed mechanism 18 is operated to delivery a substantially constant volumetric flow-rate of microbubbles from holding vessel 8 to the conveyor track 26 of weigh-belt apparatus 24. While the volumetric flow-rate issuing from the outlet of screw feed mechanism 18 is relatively constant the specific gravity of the microbubbles being delivered may vary widely. For example, the specific gravity of microbubbles specified as having a density of 0.15 g/cc may actually range in density from about 0.12 g/cc to about 0.18 g/cc. Thus, in order to insure that a constant weight flow-rate, based on weight of microbubbles, is delivered to processing point 32 weight sensing apparatus 30 is activated to sense the weight of microbubbles contained along that portion of conveyor track 26 passing over weight sensing apparatus 30 at any given time. The weight sensing apparatus 30 will compare the desired weight flow-rate of microbubbles to the weight of microbubbles deposited on conveyor track 26 and will adjust the rate of rotation of conveyor track 26 either faster or slower as is necessary in order that a steady flow rate, based on weight, is delivered to processing point 32. Further, in order to insure that the apparatus can handle even wide variances in the density of microbubbles the weight sensing apparatus 30 can be interconnected by electrical conduit 34 (shown as an alternate embodiment) with the drive means 21 (also shown as an alternate embodiment) for screw feed mechanism 18 thus slowing or speeding the rate of volumetric delivery of microbubbles to conveyor track 26. Thus, in the manufacture of water-based explosive compositions, for example, it is highly desirable to have a means by which a constant flow-rate based on weight, of microbubbles will be delivered to a processing apparatus for admixture with the other components of the water-based explosive composition. The apparatus described above can be used, in conjunction with other processing equipment, to insure that water-based explosive compositions being prepared on a continuous basis comprise the specified weight percent of microbubbles according to a preferred formula.

Alternatively, in some cases, particularly where very sensitive explosive compositions are desired, it has been determined that the density of the final explosive composition is much more important than the specific weight percent of microbubbles contained therein. Therefore, in some instances it is desirable to add a constant volumetric amount of microbubbles which will result in a final density of the explosive composition within a predeterined range. Thus, in order to achieve a constant addition of microbubbles so as to obtain an explosive composition having a specified density the apparatus of the subject invention can be operated by running the screw feed mechanism 18 at a constant rate to deliver a relatively constant volumetric flow of microbubbles to the conveyor belt 26 of weigh-belt apparatus 24. Weight sensing apparatus 30 can be deactivated such that weigh-belt apparatus 24 essentially acts as a conveyor belt for the delivery of the constant volumetric flow of microbubbles from screw feed mechanism 18 to processing point 32. This constant volumetric flow is combined with a known volumetric amount of explosive materials to form the sensitized explosive having the preferred density.

While this invention has been described in relation to its preferred embodiments, it is to be understood that various modifications thereof will now be apparent to one skilled in the art upon reading the specification and it is intended to cover such modifications as fall within the scope of the appended claims.

I claim:

1. A feed apparatus for microbubbles comprising:
   (a) a holding tank having an inlet and an outlet for retaining microbubbles delivered thereto in an aerated state for a residence time sufficient to provide a deaerated supply thereof to said outlet;
   (b) screw feed means comprising an inlet communicating with the outlet of said holding tank for receiving said deaerated microbubbles by gravity flow, an outlet, and a plurality of auger screws having intermeshing flights for conveying microbubbles from said inlet to said outlet;
   (c) weigh-belt conveyer means for receiving microbubbles deposited from the outlet of said screw feed means; said weigh-belt conveyor means being adjustably operable so as to provide for constant-flow rate, based on weight, of microbubbles to a processing point;
   (d) means for delivering aerated microbubbles to said holding tank through said inlet thereof; and
   (e) level indicating means for sensing the level of microbubbles in said holding tank and operatively connected to with said means for delivering aerated microbubbles for maintaining the level of microbubbles in said holding tank at a level which provides sufficient residence time to allow deaeration of the microbubbles prior to delivery thereof to said screw feed means wherein said level indicating means comprises a tuning fork having at last two prongs electronically vibrated at the resonant frequency that occurs when essentially no microbubbles are located between the prongs of said tuning fork said frequency changing to another frequency when microbubbles are located between said prongs; means to sense the change in frequency.

2. The apparatus of claim 1 wherein said screw feed means is interconnected to said weigh-belt means such that the rotational speed of said auger screws is varied in response to electronic signals from said weigh-belt means as necessary for effecting the constant flow-rate, based on weight, of microbubbles to said processing point.

3. An apparatus for the controlled delivery of microbubbles to a processing point comprising:
   (a) a holding vessel having an inlet and an outlet, said vessel providing a residence time of the microbubbles contained therein sufficient to provide a deaerated supply thereof to said outlet;
   (b) a level indicator for sensing the level of microbubbles contained in said vessel wherein said level indicator means comprises a tuning fork means which senses the presence of microbubbles between the prongs of said tuning fork by means of electronically monitored frequencies, said level indicating means interconnected to a microbubble delivery means for depositing microbubbles into the inlet of said vessel when the level thereof drops below a predetermined level as sensed by said level indicator means;
   (c) screw feed means having an inlet and an outlet said inlet communicating with the outlet of said holding vessel for receiving by gravity flow said deaerated microbubbles and further comprising a plurality of auger feed screws aligned such that the flights thereof intermesh; and
   (d) weigh-belt means comprising an endless track means positioned such that the microbubbles are deposited from the outlet of said screw feed means thereon; said weigh-belt means further comprising a drive means for said endless track means and a weight sensing means located adjacent a portion of said endless track means for sensing the weight of microbubbles deposited thereon and adjusting the speed of said endless track drive means so as to deliver a constant flow rate, based on weight, of microbubbles to said processing point.

4. Apparatus for the continuous delivery of microbubbles to a processing point along a process line for the continuous production of water-based explosive compositions comprising:
   (a) a storage container for microbubbles;
   (b) a holding vessel for microbubbles, having an inlet and an outlet, said vessel providing a residence time of the microbubbles contained therein sufficient to provide a deaerated supply thereof to said outlet;
   (c) a microbubble delivery conduit between said storage container and said holding vessel comprising means for delivering microbubbles from said storage container to said holding vessel;
   (d) tuning fork level indicator means communicating with the interior of said holding vessel and interconnected with said means for delivering microbubbles such that said delivery means is activated when the level of microbubbles in said holding vessel drops below a predetermined level sensed by said level indicator means;
   (e) screw feed means having an inlet and an outlet said inlet communicating with the outlet of said holding vessel for receiving by gravity flow said deaerated microbubbles and comprising a plurality of auger feed screws aligned such that the flights thereof intermesh;
   (f) a weigh-belt means comprising endless track means upon which said microbubbles are deposited from the outlet of said screw feed means, said weigh-belt means further comprising endless track drive means and weight sensing means located adjacent a portion of said endless track for sensing the weight of microbubbles deposited thereon and adjusting the speed of said endless track drive means so as to deliver a constant flow rate, based on weight, of microbubbles to said processing point.

5. The apparatus of claim 4 wherein said delivery means comprises a vacuum source interconnected to said delivery conduit to thereby suction said microbubbles out of said storage container and deliver same to said holding vessel.

6. The apparatus of claim 4 wherein said weight sensing means of said weigh-belt is further interconnected with said screw feed means to thereby adjust rotational speed of said auger screws, as well as said endless track drive means, to thereby obtain a predetermined flow rate based on weight of microbubbles to said processing point.

7. A process for the metered delivery of microbubbles to a processing point comprising:
   (a) allowing an aerated supply of microbubbles having fluid handling characteristics to settle for a period of time in a holding tank sufficient to deaerate the microbubbles so as to attain the handling characteristics of particulate matter;
   (b) delivering a substantially constant volumetric flow rate of said deaerated microbubbles downward by gravity flow to said processing point via feed screw means comprising a plurality of screw auger means having intermeshing flights; and
   (c) monitoring the level of microbubbles in said holding tank with a tuning fork which senses the presence of microbubbles between the prongs of said tuning fork by electronically monitored frequencies; and
   (d) maintaining the level of microbubbles at a level which is sufficient to provide a residence time for delivery of deaerated microbubbles to said feed screw means, said level being indicated from said monitoring step.

8. The process of claim 7 and further comprising sensing the weight of microbubbles being delivered by said substantially constant volumetric flow and adjusting the rate at which said microbubbles are delivered to said processing point according to variations in weight to achieve delivery to said processing point of a substantially constant flow rate based on weight.

9. The process of claim 7 wherein said settling time is sufficient to allow said aerated microbubbles to achieved from about 80 to about 95% of deaerated bulk density adjacent the point at which said microbubbles are delivered to said screw feed means.

10. An apparatus for the metered delivery of microbubbles which comprises:
   (a) a container for retaining aerated microbubbles delivered thereto to deaerate said aerated microbubbles so as to attain the handling characteristics of particulate matter;
   (b) means for continuously receiving by gravity flow said deaerated microbubbles from said container and for continuously delivering said microbubbles at a constant rate; and
   (c) means for maintaining the level of microbubbles in said container at a level which is sufficient to provide a residence time of delivery of deaerated microbubbles by gravity flow from said container wherein said means to maintain the level of microbubbles in said container includes a tuning fork having at least two prongs electronically vibrated at a resonant frequency that occurs when essentially no microbubbles are located between the prongs of said tuning fork, said frequency changing to another frequency when microbubbles are located between said prongs and means to sense the change in frequency for determining when additional microbubbles must be delivered to said container to maintain the level of microbubbles at a level sufficient to provide said deaerated microbubbles.

* * * * *

UNITED STATES PATENT AND TRADEMARK OFFICE
CERTIFICATE OF CORRECTION

PATENT NO. : 4,221,507
DATED : September 9, 1980
INVENTOR(S) : Robert S. Olney

It is certified that error appears in the above-identified patent and that said Letters Patent are hereby corrected as shown below:

Abstract, line 11, change "ae" to --are--.

Col. 6, line 29, change "delivery" to --deliver--.

Col. 7, line 58 (Claim 1), change "last" to --least--.

Col. 10, line 12 (Claim 9), change "achieved" to --achieve.

Signed and Sealed this

Ninth Day of December 1980

[SEAL]

Attest:

SIDNEY A. DIAMOND

Attesting Officer

Commissioner of Patents and Trademarks